United States Patent [19] [11] 3,924,060
Bedford [45] Dec. 2, 1975

[54] CONTINUOUS INFORMATION ADD-ON SYSTEM

[75] Inventor: Alan D. Bedford, St. Paul, Minn.

[73] Assignee: Hazeltine Research, Inc., Chicago, Ill.

[22] Filed: June 24, 1974

[21] Appl. No.: 482,381

[52] U.S. Cl. ............................ 178/5.6; 178/DIG. 23
[51] Int. Cl.² ............................................ H04N 7/00
[58] Field of Search ................ 178/5.6, 5.8, DIG. 23

[56] References Cited

UNITED STATES PATENTS

| | | | |
|---|---|---|---|
| 3,806,637 | 4/1974 | Sideris | 178/DIG. 23 |
| 3,838,444 | 9/1974 | Loughlin | 178/DIG. 23 |
| 3,849,594 | 11/1974 | Justice | 178/DIG. 23 |

*Primary Examiner*—Richard Murray

[57] ABSTRACT

Disclosed is a system for transmitting and receiving add-on information in conjunction with the transmission and reception of TV signals. In accordance with the invention there are provided first and second add-on signal components in phase quadrature. The second add-on signal component has, during each TV line interval, a polarity opposite to the polarity of the first add-on signal component of the preceding TV line interval to achieve substantial visual cancellation of the add-on signal components in the displayed image. Further, the second add-on signal component is representative, during each time successive line interval, of the identical add-on information represented by the first add-on signal component during the preceding line interval. Processing means are provided for cancelling redundant video information contained in time successive line intervals and reinforcing the intentionally redundant add-on information represented by the first and second add-on signal components.

17 Claims, 5 Drawing Figures

CONTINUOUS INFORMATION ADD-ON SYSTEM

BACKGROUND OF THE INVENTION

This invention relates to systems for transmitting and receiving an add-on signal in conjunction with the transmission and reception of a TV signal within the frequency band normally occupied by the TV signal alone. More specifically, this invention relates to such systems wherein intentionally redundant add-on signals are transmitted to cause visual cancellation of the add-on signal in a displayed TV image, such as is described in the co-pending application of Bernard D. Loughlin, Ser. No. 415,202, filed Nov. 12, 1973, now U.S. Pat. No. 3,842,196, entitled "System For Transmission of Auxiliary Information in a Video Spectrum," which is assigned to the same assignee as the present application and is a continuation of application Ser. No. 302,333, now abandoned.

The system described in the above-referenced co-pending application provides for a TV signal, occupying a predetermined frequency band and containing video information occurring during time successive line intervals. An add-on signal is also provided within a selected portion of the frequency band occupied by the TV signal. The add-on signal has a selected polarity during portions of alternate ones of time successive TV line intervals and has an opposite polarity during like portions of the remaining line intervals. The add-on signal also contains one element of add-on information for each alternate line interval portion which is identically repeated during the corresponding portion of the next line interval. The TV signal and add-on signal may be combined and transmitted over a common medium to a remote receiver. At the receiver the TV signal may be received and displayed in a conventional manner. The intentionally redundant and opposite polarity add-on information in alternate line intervals tends to visually cancel in the display and the redundant add-on signal may be received and processed during pairs of line interval portions to cause redundant video information to tend to cancel and redundant add-on information to tend to reinforce, thereby developing an output signal primarily representative of the add-on information.

The above-described add-on system is effective to provide one or more additional information transmission channels in connection with an existing TV transmission channel. Implementation of the system does, however, require that the add-on information be formatted and intentional redundancy established in connection with the line interval timing of the TV signal. Transmission of any particular element of add-on information takes place using two distinct time intervals, which are located one TV line interval apart, and only one such element may occupy any selected time interval. The transmission of information over such an add-on channel is therefore not continuous and to develop a continuous stream of add-on information at the receiver requires the use of additional circuitry such as "buffers" to format the add-on information at the transmitter and process the information at the receiver into the original continuous stream of data.

It is therefore an object of the present invention to provide an improved add-on system capable of transmitting a continuous stream of add-on information.

It is a further object of the invention to provide such a system which does not require correlation with the timing of the TV line intervals in the generation or processing of the add-on signal.

It is a still further object of the invention to provide such a system wherein the TV signal and add-on information may be detected and used with minimum mutual interference.

In accordance with the present invention, there is provided a system for compatibly transmitting and receiving both a TV signal and an add-on signal within the frequency band occupied by the TV signal alone. The system includes means for providing a TV signal occupying a predetermined frequency band and containing video information during time successive line intervals. There is further provided means for generating an add-on signal within a selected portion of the frequency band and having a first add-on signal component representative of selected add-on information and of a given polarity, and further having a second add-on signal component in phase quadrature with the first add-on signal component. The second add-on signal component is representative during each of said time successive line intervals of the identical add-on information represented by the first add-on signal component during corresponding portions of the preceding line interval, and the second add-on signal component has during each line interval a polarity opposite to the polarity of the first add-on signal component during corresponding portions of the preceding line interval. There is also provided means for combining the TV signal and the add-on signal to provide a combined signal suitable for transmission in a common frequency band to a remote receiver. The system further includes means for receiving the combined signal and finally means for processing the received combined signal to develop an output signal primarily representative of the add-on information.

For a better understanding of the present invention together with other and further objects thereof, reference is had to the following description, taken in connection with the accompanying drawing, while its scope will be pointed out in the appended claims.

DESCRIPTION AND OPERATION OF THE EMBODIMENT OF FIGS. 1 AND 2

Figure 1:
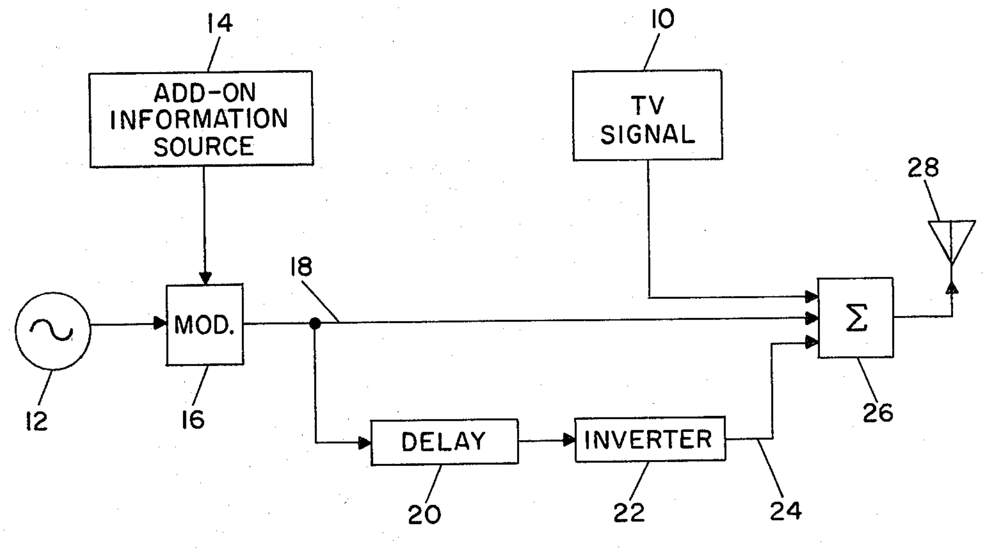
FIG. 1 is a block diagram of a transmitter constructed in accordance with the present invention.

FIG. 1 is a block diagram of a transmitter constructed in accordance with the present invention and usable in a system for transmitting a TV signal and an add-on signal in a common frequency band normally occupied by the TV signal alone. While the system is designed to operate in an environment where color TV signals are being transmitted, those skilled in the art will recognize that the concepts discussed are equally applicable to a black and white TV system.

Included in the transmitter of FIG. 1 is means 10 for supplying a TV signal occupying a predetermined frequency band. This signal may be a conventional NTSC or PAL composite color TV signal, for example. As described in the above referenced co-pending application, the composite color TV signal has relatively high amplitude components in those portions of the frequency band adjacent to the luminance and chrominance carriers and relatively low amplitude components in other portions of the frequency band, for example between the chrominance and luminance carriers and between the respective band edges and the adjacent chrominance or luminance carrier.

The means 10 in FIG. 1 may be any of the well-known means for supplying TV signals; for example, it may be a video tape recorder, a TV camera and associated equipment, or even a TV receiver such as may be used as part of the head end equipment in a cable TV system.

The transmitter shown in the block diagram of FIG. 1 further includes means 12 for generating an add-on signal carrier located within a selected portion of the TV signal frequency band. To minimize mutual interference the add-on carrier is preferably located in one of the aforementioned portions of the frequency band having relatively low amplitude components of the composite color TV signal, as is fully described in the above referenced co-pending application.

The frequency of the add-on carrier is also selected to be an odd-multiple of one-quarter of the horizontal line scanning frequency of the TV signal. For reasons which will become evident, this selection of frequency facilitates the generation of a pair of add-on signal components by delaying a first add-on signal component by a time period equal to the period between corresponding portions of time successive line intervals in the TV signal.

Further included in the FIG. 1 transmitter is means 14 for supplying a signal representative of selected add-on information. The add-on information may comprise audio data of a different language, data for displaying subtitle material on the TV image or any other desired data. The format of the data may be either analog or digital pulse code. The add-on information signal is combined with the add-on carrier in modulator 16 to provide a first add-on signal component representative of the selected add-on information and of a given polarity. The modulation format may be any of those well known in the art, but must be suitable for use with simultaneous quadrature carriers and synchronous detection. Amplitude modulation is a suitable mode of operation as well as amplitude type pulse modulation such as pulse code modulation, pulse duration modulation or pulse position modulation. Phase shift modulation is also a suitable format if it is bi-phase modulation wherein the carrier is shifted by 180°. Quadrature modulation (90° phase shift) is not suitable for use in the present invention since it could result in interference between simultaneous quadrature add-on signal components as will be explained more fully hereinafter.

The first add-on signal component, which is formed in modulator 16 is supplied to combiner 26 by lead 18. Signal generator 12, add-on information supplying means 14 and modulator 16 comprise means for supplying a first add-on signal component representative of selected add-on information and of a given polarity.

The first add-on signal component on lead 18 is also supplied to delay means 20 which delays the signal component by a period equal to the time interval between corresponding portions of time successive line intervals of the TV signal. The delay signal is then supplied to inverter 22 which reverses the polarity of the delayed signal, thereby forming a second add-on signal component representative during each line interval of the identical add-on information represented by the first add-on signal component during corresponding portions of the preceding line interval. Inverter 22 causes the second add-on signal component to have a polarity which is opposite to the polarity of the first add-on signal component during corresponding portions of the preceding line interval. Further, since, as stated above, the add-on carrier frequency is an odd multiple of one-quarter of the horizontal line scanning frequency, delay means 20 having a delay equal to the time interval between corresponding portions of time successive line intervals, has the effect of shifting the second add-on signal component by 90° with respect to the first add-on signal component. Delay means 20 and inverter 22 therefore comprise means for supplying a second add-on signal component in phase quadrature with the first add-on signal component.

Figure 3:
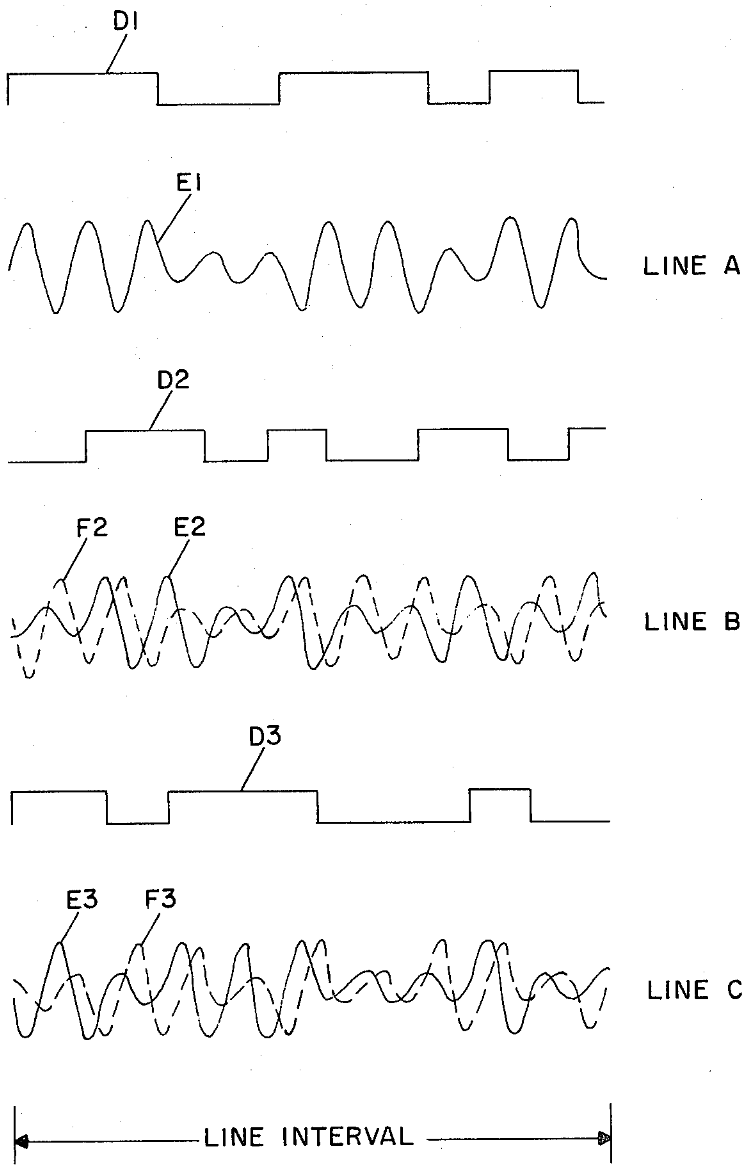
FIG. 3 is a graphic illustration of add-on signals in accordance with the present invention.

The first and second add-on signal components are graphically illustrated in FIG. 3. Shown are three successive graphs representing add-on information signals and first and second add-on signal components occurring during three time successive line intervals of a TV signal. Graphs $D_1$, $D_2$ and $D_3$ are representative of portions of an add-on information signal occurring respectively during line intervals A, B and C. As is evident from the graph, the add-on information signal ($D_1$, $D_2$ and $D_3$) is a continuous signal which is not in any way formatted to conform to the actual time at which the line intervals occur. For purposes of simplicity of illustration, the add-on information signal ($D_1$, $D_2$ and $D_3$) is illustrated as a signal which may assume any one of two discrete values at any instant of time. It should be evident to those skilled in the art that the add-on information signal may have many other formats, either analog or digital in nature. Curves $E_1$, $E_2$ and $E_3$ represent portions of a first add-on signal component corresponding to add-on information signal portions $D_1$, $D_2$ and $D_3$ respectively. As illustrated, the first add-on signal component ($E_1$, $E_2$ and $E_3$) corresponds to an add-on carrier amplitude modulated by the add-on information signal. Curves $F_2$ and $F_3$ correspond to portions of a second add-on signal component occurring during line intervals B and C. Second add-on signal component portion $F_2$ corresponds to first add-on signal component portion $E_1$ which has been delayed by a period equal to one line interval and has been inverted. Similarly, second add-on signal component portion $F_3$ corresponds to delayed and inverted first add-on signal component portion $E_2$. As a result of the generation of the second add-on signal component in this manner, the second add-on signal component portion $F_2$ has during line interval B a polarity opposite to the polarity of the first add-on signal component portion $E_1$ during preceding line interval A. Close examination of the graphs in FIG. 3 illustrates that at every corresponding point along the line interval graph $F_2$ is equal in magnitude and opposite in polarity to graph $E_1$. Likewise, graph $F_3$ is equal in magnitude and opposite in polarity to graph $E_2$. The equal, but opposite relationship of the first and second add-on signal components in adjacent line intervals tends to result in visual cancellation when the video signal containing the add-on signal is displayed.

It should be further noted in FIG. 3 that the carrier frequency of the add-on signal is an odd multiple of one-quarter the line interval frequency, in this case 39 times one-quarter the line interval frequency or 9¾ cycles per line interval. The result of this selection of frequency is that the delayed and inverter first add-on signal component portion $E_1$ from line interval A, which comprises the second add-on signal component portion $F_2$ during line interval B, is in phase-quadrature with the first add-on signal component portion $E_2$ during line interval B. This is the result of the delay being equal to the line interval or 9¾ cycles in the illustrated case, which results in a −90° phase shift. Likewise, second add-on signal component portion $F_3$ is in phase quadrature with first add-on signal component portion $E_3$. The quadrature relation of the first and second add-on signal components enables independent detection of these components in a receiver but also prevents the use of certain types of phase modulation, such as 90° phase shift keying, which, as noted above, would result in mutual interference between the signal components.

Referring again to the transmitter block diagram of FIG. 1, the first and second add-on signal components are supplied to combining means 26 by leads 18 and 24, respectively. Combining means 24 combines the first and second add-on signal components with the TV signal supplied by means 10 for transmission in a common frequency band to a remote receiver by antenna 28. It will be recognized by those skilled in the art that combining means 26 may include means for combining the first and second add-on signal components to form a composite add-on signal prior to combining these with the TV signal or any other suitable arrangement of combining circuits. Likewise, it will be evident to those skilled in the art that following combiner 26 and prior to transmitting antenna 28 there may be included apparatus for modulating the combined TV signal and add-on signal onto an RF carrier or changing the carrier frequency of the signal. There may also be included apparatus for amplifying the signal to a level suitable for transmission to a remote receiver.

Instead of transmitting the combined TV and add-on signals to a remote receiver via antenna 28, they may, of course, be transmitted via cable, transmission line or microwave link. It will be recognized that the scope of this invention includes any suitable transmission method.

Figure 2:
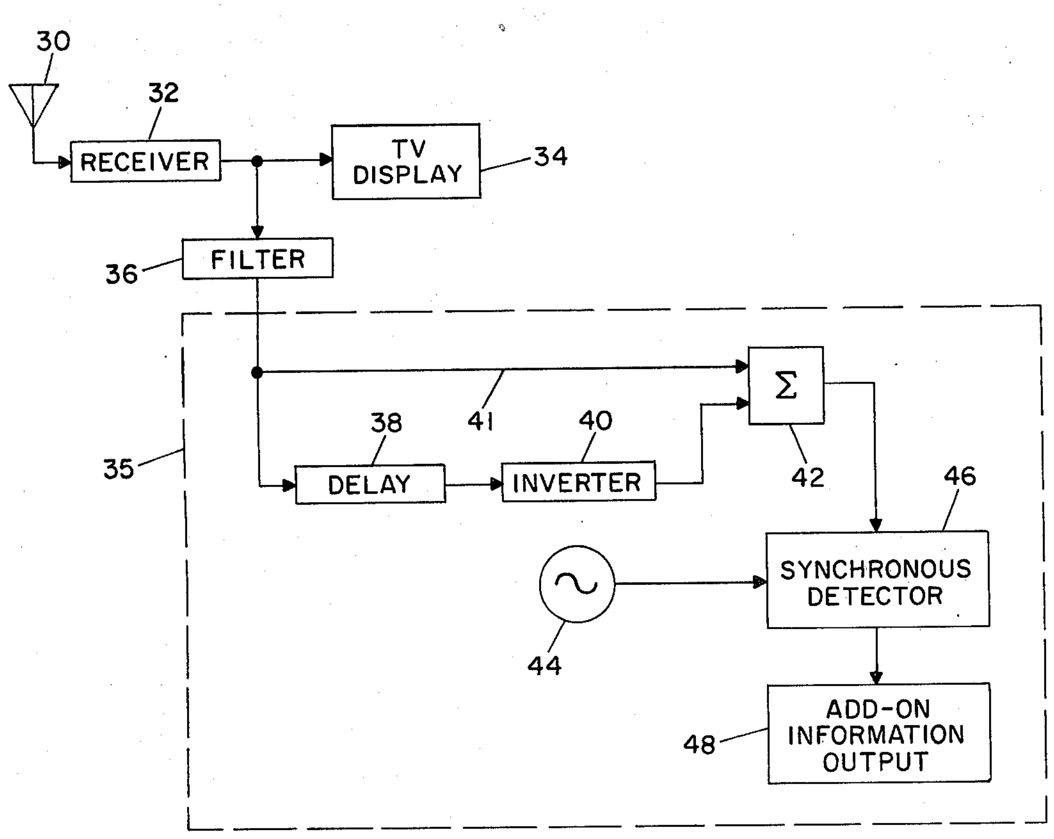
FIG. 2 is a block diagram of a receiver constructed in accordance with the present invention.

FIG. 2 is a block diagram of a receiver constructed in accordance with the present invention. The signal may be received by receiving antenna 30 or as noted above from a cable or transmission line. The combined signal comprising both TV signal and composite add-on signal may be amplified and frequency converted in receiver 32 in accordance with standard practice. The received signal may be supplied to a conventional TV display 34 wherein the video signal is used to form a displayed image in accordance with standard practice. The first and second add-on signal components, having opposite polarity during corresponding portions of successive line intervals, tend to visually cancel in the displayed image as pointed out above, thereby minimizing add-on interference in the displayed image.

The received combined signal is also provided to means 35 for processing the received combined signal to cause redundant video information occurring during successive line intervals to tend to cancel and to reinforce the add-on information represented by the first add-on signal component with the identical add-on information represented by the second add-on signal component, thereby to develop an output signal primarily representative of the add-on information. Filter 36 may be used prior to supplying the combined signal to the processing means to remove TV signal components outside the portion of the frequency band occupied by the first and second add-on signal components.

In processing means 35 the received signal is supplied to delay means 38 which delays that portion of the signal by a period of one line interval. The signal is then inverted by inverter 40 and supplied to combiner 42. The received signal is also supplied by lead 41 directly to combiner 42. At combiner 42 there are four portions of the original add-on signal supplied by modulator 16 in the transmitter. The first portion is formed by the first add-on signal component which has undergone no delay or inversion in either transmitter or receiver. The second portion is formed from the second add-on signal component which has been delayed and inverted in both transmitter and receiver. The third and fourth portions are formed from the first and second add-on signal components which have undergone only a single delay and inversion in either the transmitter or the receiver. The second signal portion as a result of the two delays and two inversions will be out of phase with the first signal portion by 180°. These signal portions would therefore cancel at combiner 42 except for the fact that they may have dissimilar modulation. The third and fourth signal portions have undergone the identical delay and inversion and will therefore reinforce at combiner 42 and will have a quadrature phase relation with respect to the first and second signal portions. The output signal from combiner 42 is supplied to synchronous detector 46 along with a locally regenerated add-on carrier from generator 44. Synchronous detector 46 detects the add-on information contained in the mutually reinforced third and fourth signal portions and, as is characteristic of a synchronous detector, rejects the uncancelled parts of the first and second signal portions which are in phase quadrature with the reinforced third and fourth signal portions. The detected add-on information may then be supplied to a suitable output device 48. Add-on carrier generator 44 may be of the type described in the co-pending allowed application of S. I. Sideris, Ser. No. 302,331, filed Oct. 30, 1972, entitled "Apparatus for Resolving Phase Ambiguities in Regenerated Carrier Signals," or of any other suitable type.

Portions of the TV signal which are supplied to processing means 35 via filter 36 tend to cancel in combiner 42. Such video information supplied to combiner 42 by lead 41 during each time successive line interval has the opposite polarity of redundant video information from the preceding line interval which is simultaneously supplied to combiner 42 by delay means 38 and inverter 40. These signals therefore tend to cancel in combiner 42, as is explained in further detail in the above-referenced copending application of B. D. Loughlin, Ser. No. 415,202.

DESCRIPTION OF THE FIG. 4 AND FIG. 5 EMBODIMENTS

There are many techniques available to those skilled in the art for generating a composite add-on signal in accordance with Applicant's invention. For example, it is possible in the implementation of the FIG. 1 transmitter to locate inverter 22 on lead 18, thereby causing inversion of the first add-on signal component and resulting in the second add-on signal component having the requisite opposite polarity described above.

Figure 4:
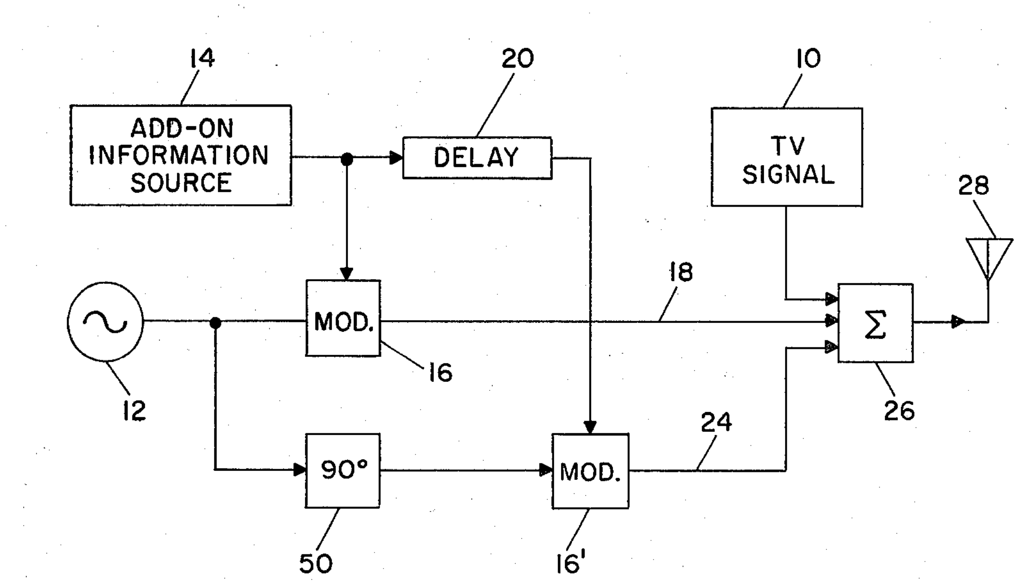
FIG. 4 is a block diagram of an alternative transmitter embodiment constructed in accordance with the present invention.

Another embodiment of a transmitter constructed in accordance with the present invention is illustrated in FIG. 4. The FIG. 4 embodiment does not require the delay of the add-on signal component itself, but rather a delay only of the signal representative of the add-on information. In some applications, for example where the add-on information is a digital code, delay of the information signal may be more easily implemented than delay of the modulated carrier. The first add-on signal component in the FIG. 4 transmitter is formed by modulating the add-on carrier supplied by generating means 12 with the undelayed add-on information signal in modulator 16. A second add-on signal component is formed by phase shifting the add-on carrier by 90° in phase shifter 50 and modulating the phase-shifted carrier in modulator 16' with the delayed add-on information signal supplied by delay means 20. The necessity of inverting the polarity of the second add-on signal component may be eliminated in the FIG. 4 transmitter by selecting phase shifter 50 to provide either 90° or −90° of phase shift according to whether the carrier has been selected to have an integer plus one-quarter or integer plus three-quarter multiple of the line interval frequency. For example, if as shown in FIG. 3, the add-on carrier has a frequency of 9¾ times the line interval frequency, a phase shift of −90° is appropriate to cause the second add-on signal component to have a polarity during each line interval opposite to the polarity of the first add-on signal component during the preceding line interval. Conversely, if the add-on carrier were selected to be 9¼ times the line interval frequency, a phase shift of 90° would be appropriate. Either a 90° or −90° phase shift results in the second add-on signal component being in phase quadrature with the first add-on signal component.

Figure 5:
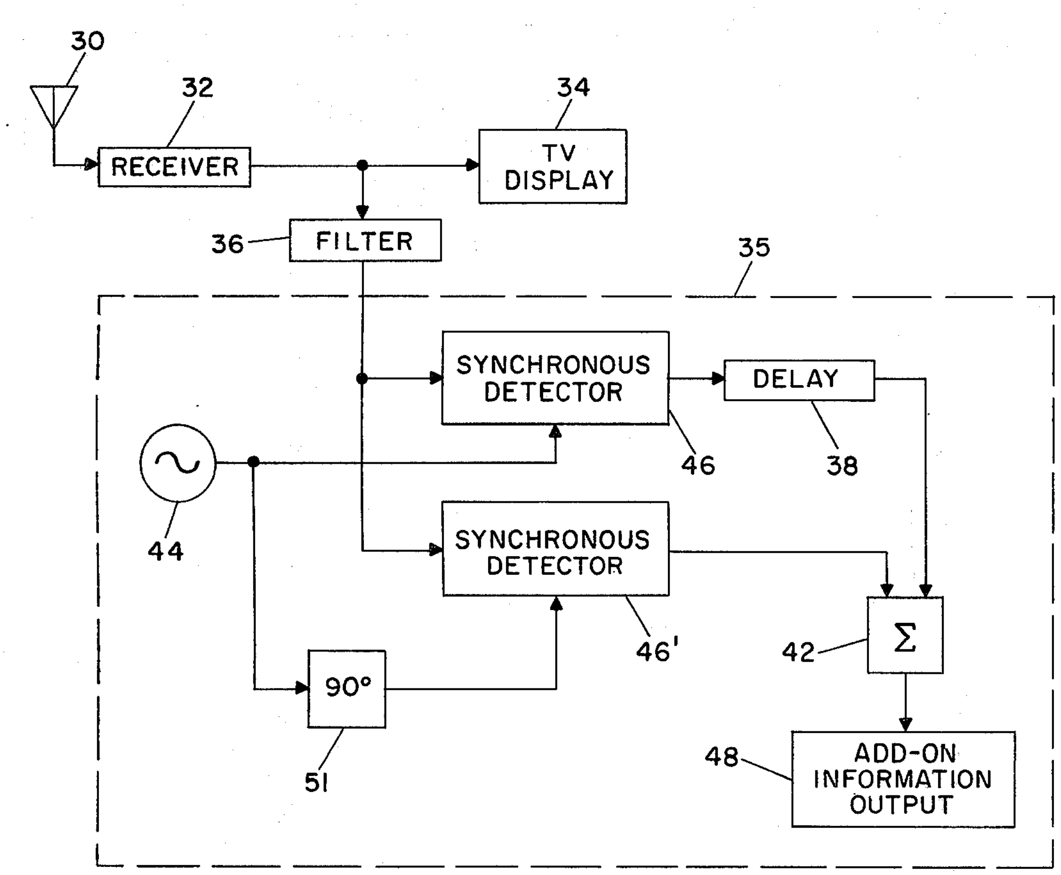
FIG. 5 is a block diagram of an alternative receiver embodiment constructed in accordance with the present invention.

FIG. 5 shows an embodiment of a receiver built in accordance with the present invention which enables the required delay to be implemented after detection of the add-on information signal. As in the FIG. 2 embodiment, the received combined signal is provided to processing means 35 by filter 36. A portion of the signal is then provided to each of two synchronous detectors 46 and 46'. A locally regenerated add-on carrier is supplied by generating means 44 directly to synchronous detector 46 and to synchronous detector 46' by phase shifting means 51. Generating means 44 may be phase controlled to provide an output suitable for the synchronous detection of the first add-on signal component in synchronous detector 46. Likewise, phase shifter 51 may be appropriately selected to have 90° or −90° of phase shift according to the phase of the second add-on signal component and its output used in synchronous detector 46' to detect the second add-on signal. As illustrated in FIG. 5, the output signal of synchronous detector 46 may be appropriately delayed by delay means 38 and combined with the output of synchronous detector 46' in combiner 42 to provide a reinforced add-on information signal output to output means 48.

While there has been described what is at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A system for compatibly transmitting and receiving both a TV signal and an add-on signal within the frequency band occupied by the TV signal, comprising:

means for supplying a TV signal occupying a predetermined frequency band and containing video information during time successive line intervals;

means for supplying a signal representative of selected add-on information;

means, responsive to said add-on information representative signal, for generating first and second modulated add-on signal components in phase quadrature at a common carrier frequency lying within a selected portion of said frequency band, wherein the modulation of said first add-on signal component is representative of said selected add-on information during time successive line intervals and wherein during each line interval the modulation of said section add-on signal component is representative of identical but opposite polarity add-on information as that represented by the modulation of said first add-on signal component during corresponding portions of the preceding line interval;

means for combining said TV signal and said first and second add-on signal components to develop a combined TV and add-on signal suitable for transmission in a common frequency band to a remote receiver;

means for receiving said combined signal;

and means for processing said received combined signal to develop an output signal primarily representative of said selected add-on information.

2. A system as specified in claim 1 wherein said carrier frequency is an odd multiple of one-quarter of the frequency at which said time-successive line intervals occur.

3. A system as specified in claim 1 wherein said selected portion of said frequency band lies between the normal location of the luminance and chrominance carrier frequencies of said TV signal.

4. A system as specified in claim 1 wherein the modulation of said first and second add-on signal components is amplitude modulation.

5. A system as specified in claim 1 wherein the modulation of said first and second add-on signal components is phase modulation.

6. A transmitter for use in a system for compatibly transmitting and receiving both a TV signal and an add-on signal within the frequency band occupied by said TV signal, comprising:

means for supplying a TV signal occupying a predetermined frequency band and containing video information during time-successive line intervals;

means, responsive to said add-on information representative signal, for generating first and second modulated add-on signal components in phase quadrature at a common carrier frequency lying within a selected portion of said frequency band, wherein the modulation of said first add-on signal component is representative of said selected add-on information during the successive line intervals and wherein during each line interval the modulation of said second add-on signal component is representative of identical but opposite polarity add-on information as that represented by the modulation of said first add-on signal component during corresponding portions of the preceding line interval;

means for combining said TV signal and said first and second add-on signal components to develop a combined TV and add-on signal suitable for transmission in a common frequency band to a remote receiver.

7. A transmitter as specified in claim 6 wherein said means for generating first and second add-on signal components comprises:

means for generating an add-on signal carrier within a selected portion of said frequency band, said add-on carrier having a frequency which is an odd-multiple of one-quarter the frequency at which said time-successive line intervals occur;

means for supplying a signal representative of selected add-on information;

means for modulating said add-on carrier with said add-on information representative signal, thereby developing said first add-on signal component;

and means, responsive to said first add-on signal component, for developing said second add-on signal component directly therefrom.

8. A transmitter, as specified in claim 7 wherein said means for developing said second add-on signal component comprises means, responsive to said first add-on signal component, for delaying said first add-on signal component by a period equal to the time period between corresponding portions of said time-successive line intervals, and means for inverting said delayed first add-on signal component, thereby developing said second add-on signal component.

9. A transmitter as specified in claim 6 wherein said means for generating first and second add-on signal components comprises:

means for generating an add-on signal carrier within a selected portion of said frequency band, said add-on carrier having a frequency which is an odd multiple of one-quarter the frequency at which said time-successive line intervals occur;

means for supplying a signal representative of selected add-on information;

means for modulating said add-on carrier with said add-on information representative signal, thereby developing said first add-on signal component;

means for delaying said add-on information representative signal by a period equal to the time period between corresponding portions of time-successive line intervals;

means for phase shifting said add-on signal carrier by a selected amount;

means for modulating said phase-shifted add-on signal carrier with said delayed add-on information representative signal, thereby developing said second add-on signal component.

10. A transmitter for use in a system for compatibly transmitting and receiving both a TV signal and an add-on signal within the frequency band occupied by said TV signal, comprising:

means for supplying a TV signal occupying a predetermined frequency band and containing video information during time successive line intervals;

means for generating an add-on signal carrier within a portion of said frequency band between the normal location of the luminance and chrominance carrier frequencies of said TV signal, said add-on carrier having a frequency which is an odd multiple of one-quarter the frequency at which said time successive line intervals occur;

means for supplying a signal representative of selected add-on information;

means for modulating said add-on carrier with said add-on information representative signal to develop a first modulated add-on signal component whose modulation is representative of said selected add-on information during time successive line intervals;

means for delaying said first add-on signal component by a period equal to the time period between corresponding portions of said time-successive line intervals;

means for inverting said delayed first add-on signal component to develop a second modulated add-on signal component in phase quadrature with said first add-on signal wherein during each line interval the modulation of component, said second add-on signal component is representative of identical but opposite polarity add-on information as that represented by the modulation of said first add-on signal component during corresponding portions of the preceding line interval;

and means for combining said TV signal and said first and second add-on signal components to develop a combined TV and add-on signal suitable for transmission in a common frequency band to a remote receiver.

11. A receiver, for use in a system for compatibly transmitting and receiving a combined signal comprising a TV signal and an add-on signal within the frequency band occupied by said TV signal, wherein said TV signal occupies a predetermined frequency band and contains video information during time-successive line intervals, and wherein said add-on signal comprises first and second modulated add-on signal components in phase quadrature at a common carrier frequency lying within a selected portion of said frequency band, wherein the modulation of said first component is representative of selected add-on information during time successive line intervals and wherein during each line interval the modulation of a second add-on signal component is representative of identical but opposite polarity add-on information as that represented by the modulation of said first add-on signal component during corresponding portions of the preceding line interval said receiver comprising:

means for receiving said combined signal;

and means for processing said received combined signal to develop an output signal primarily representative of said add-on information.

12. A receiver as specified in claim 11 wherein said means for processing said received combined signal comprises means for causing redundant TV video information occurring during time-successive line intervals to tend to cancel and for causing add-on information represented by the modulation of said first add-on signal component to tend to reinforce with identical add-on information represented by the modulation of said second add-on signal component, thereby to develop an output signal primarily representative of said add-on information.

13. A receiver as specified in claim 12 wherein said means for processing said received combined signal comprises means for delaying said received combined signal by a period equal to the time period between corresponding portions of time successive line intervals, means for inverting said delayed received combined signal, and means for adding said delayed, inverted received combined signal to the undelayed, uninverted received combined signal, thereby to cause redundant TV video information to tend to cancel and to cause said add-on information represented by the modulation of said first add-on signal component to tend to reinforce with said identical add-on information represented by the modulation of said second add-on signal component.

14. A receiver as specified in claim 13 which additionally includes a synchronous detector coupled to the output of said adding means for demodulating said reinforced add-on signal components and developing an output signal primarily representative of said add-on information.

15. A receiver as specified in claim 12 wherein said means for processing said received combined signal comprises means for detecting said add-on information represented by the modulation of said first add-on signal component, means for detecting said add-on information represented by the modulation of said second add-on signal component, means for delaying the detected add-on information represented by said first add-on signal component by a period equal to the time period between corresponding portions of time-successive line intervals, and means for combining the detected add-on information represented by said second add-on signal component with the delayed detected add-on information represented by said first add-on signal component, whereby said delayed and undelayed add-on information tends to reinforce whereas redundant TV video information occurring during time-successive line intervals tends to cancel.

16. A receiver as specified in claim 15 wherein said means for detecting said first and second add-on signal components each comprises a synchronous detector.

17. A receiver as specified in claim 12 which additionally includes TV display means for displaying said received combined signal, whereby said first and second add-on signal components, having opposite polarity during corresponding portions of time successive line intervals, tend to cancel in the displayed image.

* * * * *